April 12, 1966  A. F. BLEIWEISS ETAL  3,246,181
LOAD INSENSITIVE SERIES THERMOMOTIVE FLASHER
Filed Oct. 12, 1962                               5 Sheets-Sheet 1
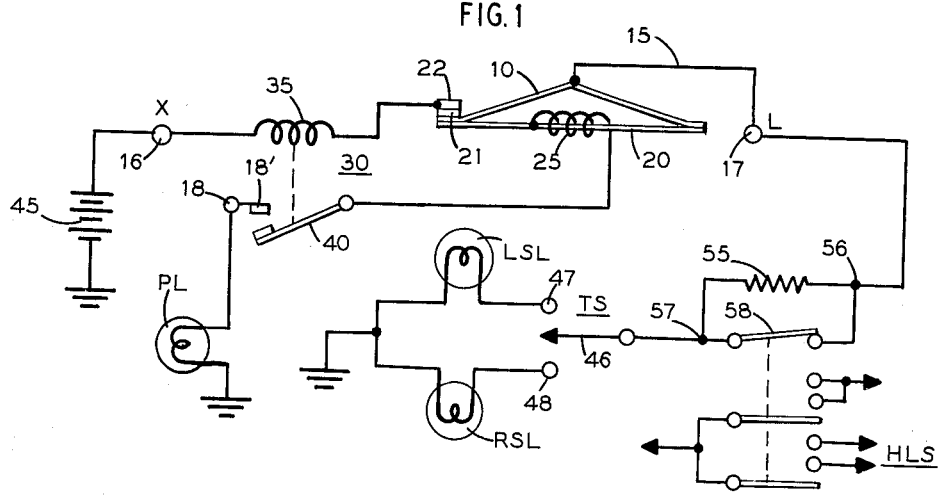
FIG.1
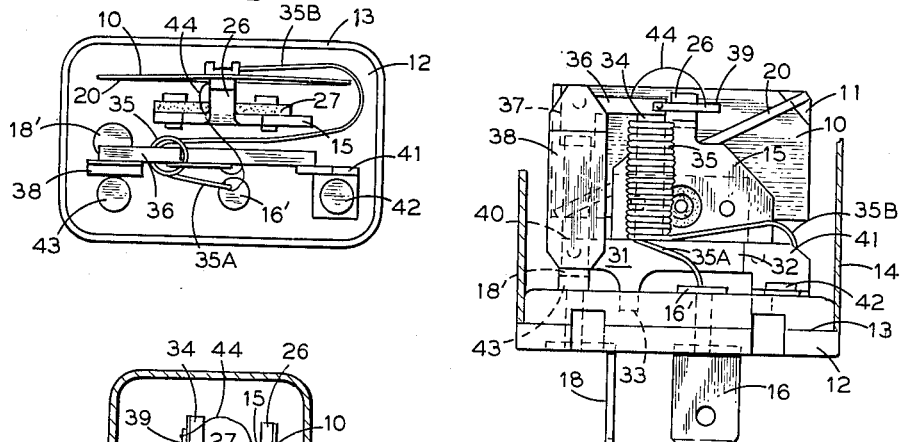
FIG.2
FIG.3
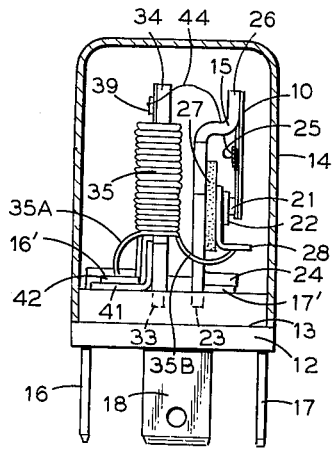
FIG.4
INVENTORS
Arthur F. Bleiweiss
George Colombo
BY  John B. Dickson
Blum, Moscovitz, Friedman and Blum
ATTORNEYS April 12, 1966     A. F. BLEIWEISS ETAL     3,246,181
LOAD INSENSITIVE SERIES THERMOMOTIVE FLASHER
Filed Oct. 12, 1962     5 Sheets-Sheet 3

April 12, 1966  A. F. BLEIWEISS ETAL  3,246,181
LOAD INSENSITIVE SERIES THERMOMOTIVE FLASHER
Filed Oct. 12, 1962  5 Sheets-Sheet 5

United States Patent Office 3,246,181
Patented Apr. 12, 1966

3,246,181
LOAD INSENSITIVE SERIES THERMOMOTIVE FLASHER
Arthur F. Bleiweiss, Great Neck, George Colombo, East Rockaway, and John B. Dickson, Kew Gardens, N.Y., assignors to Signal-Stat Corporation, Brooklyn, N.Y., a corporation of New York
Filed Oct. 12, 1962, Ser. No. 230,050
18 Claims. (Cl. 307—132)

This invention relates to thermomotive flashers of the snap action series type and, more particularly, to a novel flasher of this type which is load insensitive and which will operate at uniform f.p.m. rates and uniform "on-time" ratios irrespective of the flasher load within wide limits.

Thermomotive flashers of the snap action series type have found widespread acceptance for use in automotive signalling systems, such as in turn signalling systems and the like. The advantages of this type of flasher include, in addition to its relative simplicity and relatively low cost, the fact that the signal lamps are lighted immediately whenever the turn signal switch, for example, is closed in either the "left" or "right" position, this providing a "rapid start" of the signalling. However, due to the fact that the heating of the thermomotive operating element of such a flasher varies with the load current, the operating rate of the flasher is relatively load sensitive as well as being relatively sensitive to variations in the value of the operating potential applied across the flasher terminals. Thus, if the load is heavier than normal, the flashing rate or "f.p.m." will increase, and the ratio of on-time to total cycle time will decrease. The reverse occurs if the load is lighter than normal.

This is unsatisfactory for automotive vehicle operations as it has been found, by experience, that the most effective signal is provided when the flashing rate is approximately 90 f.p.m. with an on-time ratio of approximately 50%, and that when the flashing rate is outside the range of approximately 60 f.p.m. to 120 f.p.m., or the on-time ratio is outside the range of approximately 30% to 75%, the signal is generally conceded to be not easily recognizable. For this reason, various arrangements have been proposed for compensating the flasher so that it will operate at substantially constant or uniform f.p.m. rates and substantially constant or uniform on-time ratio over a wide range of operating potentials, as from eleven to fifteen volts, for example, in the case of a flasher operating on a nominal twelve-volt system. These compensating arrangements, in cooperation with the production controls utilized during the manufacture of the flashers, provide flashers which give satisfactory performance insofar as variations in operating potential applied thereto are concerned.

The principles used to compensate for variations in applied potential can also be used, to some extent, for compensating for variations in load, but only within a relatively small range. However, it has not been possible hitherto to compensate for wide variations in load, as, for example, where the number of lamps operated by the flasher is either doubled or halved. Additionally, too much compensation for load variations may result in loss of a desirable characteristic of the series thermomotive type flasher, which is that the flasher gives an indication when one or more of the signal lamps controlled thereby are inoperative for any reason or when there is a circuit break in the controlled circuit.

This question of compensation for variations in load has become of great importance recently with proposals to have different lamp intensities for daytime and nighttime driving. For example, a signal lamp which has an intensity sufficient to provide a clearly discernible turn or stop signal under daytime driving conditions, and particularly in bright sunlight, is entirely too bright for nighttime operation, with the result that the glare interferes with the signalling effect. Similarly, a lamp having an intensity or output only a little more than sufficient to provide a distinctly recognizable signal during nighttime driving along dark roads has an intensity which is entirely too low to provide a distinctive signal during daytime driving in bright sunlight.

At present, various arrangements are being considered for automatically providing the proper intensity of signal lamps during both day and nighttime operation. One proposed method is to use dual signal lamps or dual filament signal lamps, with the two filaments having different intensities, and another proposal involves the cutting of a voltage dropping resistance into the signal lamp circuit during nighttime driving. Both proposals have, in common, the feature that the switch-over from one intensity filament to the other, or the cutting in of the series resistance, is accomplished as a result of the normal operation of the usual headlamp control switch between its "off" position and an "on" position, so that no conscious operation on the part of the driver is needed to condition the lamps selectively for daytime driving or for nighttime driving. However, the use of dual intensity lamps or lamps arranged in pairs with different intensities, as well as the use of a series dropping resistor during nighttime driving, involve wide variations in the load on the flasher between operations under nighttime driving conditions and operations under bright daytime driving condition.

Wide variations in flasher load also occur in the case of a car or truck equipped for selective electrical and mechanical connection of a trailer thereto, the flasher load being substantially increased when the trailer signal lamps are connected to the signal lamp circuits of the car or truck. Another instance of flasher load variation arises in connection with the increasingly popular practice of flashing all of the turn signal lamps at the same time as a "traffic hazard warning" or "flare" signal. In this case, the flasher load is substantially double during "flare" operation as compared to the load during normal turn signalling.

A typical thermomotive flasher of the snap action series type is shown in U.S. Patent No. 2,756,304, issued July 24, 1956, to J. W. Welsh. The flasher shown in this patent comprises a vane of electrically conductive snap action material which is initially deformed so as to be bent, about a first bending line, to a "restored" position and which is constrained to be bent about a second line, intersecting said first bending line at an angle, into a "stress-deformed" position by a heat expansible pull element such as a ribbon or wire which is preferably electrically conductive, is supported at a position spaced from the pull element and the latter carries a relatively movable contact which is normally engaged with a relatively fixed contact. When a circuit, including the fixed and movable contacts, the pull element, the vane, a load and a source of potential, is closed, the pull element heats and expands and, after predetermined expansion, permits the vane to snap to its restored position. As a result of such snapping, the two contacts are snapped apart to the open position and thus break the circuit. The pull element thus tends to cool and contract and, after a predetermined amount of contraction, snaps the vane back to its stress-deformed position to re-close the contacts and re-close the circuit. This operation is cyclically repeated as long as a control switch is closed.

In a modified form of this flasher, the pull element is heated indirectly by a separate heating element so that the heating current does flow through the pull element itself. Arrangements of this type are shown, for example, in Welsh Patent No. 2,712,044 and Colombo Patent No. 2,907,850. As more particularly shown in the latter patent, this heating element may be a heating winding which is electrically insulated from the pull element but is wound therearound.

The Welsh type of snap action flasher, involving a snap action vane, while having the advantages of other series flashers also has the disadvantages thereof with respect to sensitivity to variations in load. While various arrangements have been proposed to solve this difficulty, those proposed hitherto have either been difficult to put into practice, or expensive, or subject to early malfunction.

In accordance with the present invention, it has been found that a series type snap action flasher which is substantially completely insensitive to variations in load may be provided by an arrangement in which the heating circuit for the thermomotive operator is connected in series with the flasher load contact but in parallel with the flasher load itself. With such an arrangement, and with the load contacts normally closed, the heater circuit would normally be operative at all times. Therefore, a pair of normally open contacts are provided in the heating circuit and are controlled by a relay coil connected in series with the load contacts in the load circuit. Consequently, whenever the load circuit is closed, as by movement of a turn signal selector switch to either of its operated positions, the relay coil is energized and immediately closes the contacts in the heating circuit for the thermomotive operator. Thus, the flasher operates in exactly the same manner as the usual series type snap action flasher, but is insensitive to load as the load current does not flow through the heating circuit. Consequently, the invention flasher has none of the disadvantages of the usual series type thermomotive snap action flasher.

In a preferred form of the invention, the load contacts, which are normally closed, comprise a relatively fixed contact and a relatively movable contact which is preferably supported upon the electrically conductive snap action vane of the Welsh type flasher. The pull ribbon of the flasher, which is secured at its opposite ends to the vane while in a cold and contracted condition, has an insulated heater winding wound therearound and with one end electrically connected to the pull element. A relay coil is connected in series between the "X" or input terminal of the flasher and the relatively fixed load contact. The other end of the heater winding is connected to one of a pair of normally open contacts operated by the relay coil, and the other contact of this pair of normally open contacts is connected to ground. The snap action vane of the flasher is connected to the "L" or load terminal of the flasher. This load terminal may have a suitable load connected thereto such as, for example, a turn signalling system of an automotive vehicle, and this may have associated therewith the aforementioned arrangement for providing different levels of illumination during daytime and nighttime driving.

However, while this is a preferred form of the invention, the invention may take numerous other forms insofar as constructional features are concerned, and may, if desired, have voltage variation compensating means associated therewith.

For an understanding of the principles of the invention, reference is made to the following description of typical embodiments thereof as illustrated in the accompanying drawings. In the drawings:

FIG. 1 is a schematic electrical diagram of a preferred form of load insensitive series snap action flasher embodying the invention;

FIG. 2 is a plan view of the flasher shown in FIG. 1 schematically;

FIG. 3 is one side elevational view of the flasher of FIG. 2, with a cover being shown partly in section;

FIG. 4 is one end elevational view of the flasher shown in FIG. 2, with the cover or shell being shown in section.

Figure 6:
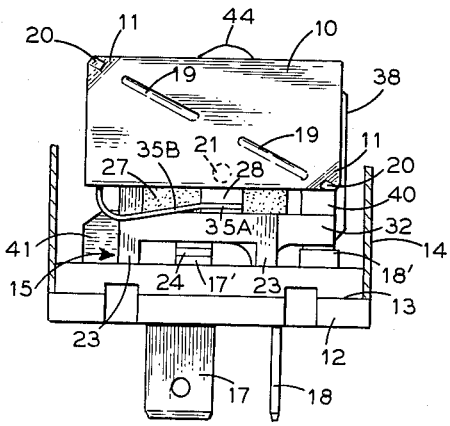
FIG. 6 is an opposite side elevational view of the flasher shown in FIG. 2.

Referring first to FIGS. 1 through 6, the principal operating components of the flasher are a snap action, preferably electrically conductive metal, vane 10 to which is attached a pull element, such as ribbon 20, which is preferably electrically conductive but which is essentially thermally expansible, and a relay 30 having an operating coil or winding 35 connected in series with the load controlling contacts of the flasher.

The flasher selected for illustration of the principles of the invention, as shown more particularly in FIGS. 2 through 6, is of the general type shown in said Welsh and Colombo patents. Thus, vane 10 is formed with linearly extending aligned and spaced pre-set deformations 19 which extend diagonally thereacross and provide an initial bending line about which vane 10 is bent in its "restored" condition. At the ends of this diagonal, the corners 11 of the vane 10 are bent out of the general plane of the latter and the opposite ends of the pull ribbon 20 are permanently secured thereto as by welding, soldering, brazing or the like. Pull ribbon 20 is secured to vane 10 in the cold and contracted condition of the pull ribbon and while the vane is bent about another bend line extending at an angle to the deformations 19 forming the initial bend line. Thereby, vane 10, with pull ribbon 20 attached thereto, is bent about this other bend line in a "stress-deformed" condition to store potential energy in the vane so that the latter tends always to snap back to the "restored" condition as soon as the tension holding it in the "stress-deformed" condition is released.

As the temperature of pull ribbon 20 increases, due either to the flow of electric current therethrough or to a heat input thereto other than by the flow of electric current, pull ribbon 20 expands and, after a predetermined expansion of pull ribbon 20, the potential energy in vane 10 overcomes the holding force of pull ribbon 20 and the vane 10 snaps to its restored condition in which it is bent about the linear deformations 19. As pull ribbon 20 cools and contracts, it snaps vane 10 back to the stress-deformed condition in which it is bent about the bend line extending at an angle to the deformations 19. As further explained in said Welsh Patent No. 2,756,304, when vane 10 is fixedly supported at a zone or point spaced laterally of the initial bend line defined by the linear deformations 19, a movable portion of the vane will have a relatively high amplitude of motion when the vane is alternatively snapped between its restored and stress-deformed conditions.

As best seen in FIGS. 2 through 6, the flasher operating elements are supported upon a dielectric base 12 which, in the particular form illustrated, is substantially rectangular with rounded corners and has a ledge 13 extending therearound and serving as a seat for a metal casing or shell 14 for the flasher. However, it should be understood that, while a substantially rectangular base is illustrated, the base could have any other planar configuration desired without departing from the scope of the invention.

Base 12 is provided with three lugs or prongs 16, 17 and 18 which are shown as electric terminals in FIG. 1. Lug 16 is the usual "X" or "battery" terminal of the flasher, lug 17 is the "L" or "load" terminal of the flasher, and lug 18 is usually the "P" or "pilot" terminal of the flasher. In the illustrated embodiment, lugs 16, 17 and 18 are secured to base 12 by rivets 16', 17' and 18', respectively, although it is within the purview of the invention that these lugs may be embedded through the base 12 so as to project from the upper surface thereof, as by molding into the base during formation of the latter.

An electrically conductive metal bracket 15 has a pair of lugs 23 projecting from its lower edge and embedded in the base 12. Intermediate lugs 23, the lower edge of bracket 15 is formed with a lateral extension 24 which is welded, brazed, soldered or the like to the rivet 17'. The upper and narrower edge of the bracket 15 has a relatively narrow tongue 26 bent laterally outwardly and then upwardly therefrom. Vane 10 is welded, soldered, brazed or the like to the tongue 26, adjacent the upper edge of the vane 10, to form a support point for the vane about which the latter may pivot or deflect during its snapping to and fro.

A plate 27 of dielectric material is secured to the outer surface of the bracket 15, and an angular bracket 28 is secured to the plate 27 and thus insulated from the bracket 15. A first load contact 21 electrically and mechanically secured to the vane 10 adjacent its lower edge is normally engaged with a second load contact 22 which is electrically and mechanically connected to the bracket 28. Contacts 21 and 22 constitute the load-carrying contacts of the flasher. Contacts 21 and 22 are normally closed, as when vane 10 is in the stress-deformed condition, and are snapped open when vane 10 snaps to the restored condition.

Figure 5:
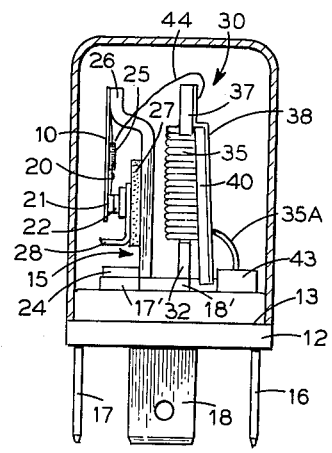
FIG. 5 is an opposite end elevational view of the flasher shown in FIG. 2.

Relay 30 includes a paramagnetic core 31 having a lower generally horizontal leg 32 formed with a projection 33 embedded in the base 12. The longer portion of the leg 32, which extends to the right as viewed in FIG. 3, is welded, brazed, or soldered to an angular bracket 41 secured to the base 12 by rivet 42. Core 31 has a generally vertical leg 34 extending upwardly from leg 32, and the winding 35 is wound on this leg 34. An upper horizontal leg 36 extends from the vertical leg 34, to the left as viewed in FIG. 3, and has a downturned end 37. This downturned end 37 is vertically aligned with the left end of the lower leg 32 which extends over the rivet 18' in spaced relation thereto. A paramagnetic spring arm or armature support 38 has its upper end secured, as by welding, brazing, or soldering to the extension 37 of the upper leg 36, and support 38 carries the paramagnetic armature 40 of the relay 30, as best seen in FIG. 5. Spring support arm 38 is normally so biased that it will tend to engage a stop lug 43 which is integral with base 12 and projects from the upper surface thereof in spaced relation to the rivet 18'. When relay 30 is energized, armature 40 will be attracted toward leg 32 of core 31 and will engage the river 18'.

Referring particularly to FIGS. 2 through 6, one end 35a of winding 35 is electrically connected to the rivet 16', and the opposite end 35b is brought out and around the vane 10 and electrically connected, as by welding, soldering, or brazing, to the bracket 28 carried by the dielectric element 27 and in electrical contact with load contact 22.

In the arrangement illustrated in FIGS. 1 through 6, the pull ribbon 20 is provided with an insulating heating winding 25 wound thereon, and one end of this heater winding is electrically connected to the pull ribbon 20. A lead 44 connects the other end of the heater winding to an electrically conductive strip 39 electrically and mechanically connected to the upper leg 36 of core 31 of the relay 30.

The operation of this embodiment of the flasher will be best understood by reference to FIG. 1. A battery 45 has one terminal grounded and the other terminal connected to the "X" lug 16 of the flasher. Lug 18 of the flasher, which is normally the "P" lug, is grounded as indicated. In FIG. 1, the flasher is illustrated as used in an automotive vehicle turn signal system for flashing left and right turn signal lamps LSL and RSL, respectively. Selective flashing of these lamps is controlled by a turn signal switch TS which has a movable armature 46 selectively engageable with either of a pair of contacts 47 and 48 each connected to one terminal of a respective lamp LSL or RSL, the other terminals of these lamps being grounded.

Furthermore, the turn signal arrangement is indicated, by way of an example of variable load, as arranged for day-night operation wherein the luminous intensity of the lamps LSL and RSL is reduced for nighttime driving. For this purpose, a dropping resistor 55 is connected between a pair of junction points 56 and 57. Junction point 56 is connected to the "L" or load terminal 17 of the flasher, and junction point 57 is connected to the armature 46 of the turn signal switch TS. The usual automotive headlamp control switch HLS, arranged to turn the parking and driving lights on and off, is shown as provided with an additional switch-closer 58 which is normally closed in shunt with the dropping resistor 55 when the switch HLS is in the off position. In either one of the two nighttime positions of the switch HLS, the switch-closer 58 is opened. Thus, the dropping resistor 55 is shunted or shorted by the switch-closer 58 during daytime driving, but is effectively cut into series between the flasher and the turn signal lamps during nighttime driving when the switch-closer 58 is opened. The switch HLS is shown in its off or daytime driving position.

It will be noted that the load contacts 21 and 22 are normally closed. Hence, if the turn signal switch TS is operated to either of its positions, a circuit will be closed from battery 45 through the one or the other of the signal lamps LSL or RSL. This circuit is as follows: battery 45, terminal 16, relay winding 35, contacts 22 and 21, vane 10 and pull ribbon 20 in parallel, bracket 15, terminal 17, dropping resistor 55, turn signal switch TS, and one of the lamps LSL or RSL to ground. Upon flow of this load current, the relay coil 35 will be energized to close the armature 40 against the rivet 18' to complete the following circuit which is in parallel with the load circuit from the contacts 21, 22 onward: pull element 20, heater element 25, armature 40, rivet 18', lug 18, pilot lamp PL and ground. Thus, a heating circuit for the pull ribbon 20 is closed, and this heating circuit is in parallel with the load circuit extending from the contact 21.

After a sufficient heating time, the pull ribbon 20 expands sufficiently to allow the vane 10 to snap to its restored position to snap open the contacts 21 and 22. This simultaneously opens the load circuit of the flasher and the heating circuit for the pull element, so that the relay 30 drops its armature 40 which disengages the rivet 18' and engages the stop lug 43. The pull ribbon 20 then contracts and cools and, after a predetermined contraction, snaps the vane 10 back to its stress-deformed condition to re-engage the contacts 22. This immediately re-closes the load circuit through the load terminal 17 and simultaneously, due to the energization of the coil 35, the relay armature 40 is closed against the rivet 18' to re-close the heating circuit for the pull ribbon 20.

As the heating circuit for the pull ribbon 20 is in parallel with the load circuit, from the contact 21 onwardly, there is no load current through the heating circuit and thus the heating of the pull ribbon 20 is in no way affected by the value of the load current. Nevertheless, substantially instantaneous action of the flasher is achieved by virtue of the relay coil 35 connected in series in the load circuit and operating the armature 40. It will be noted that the flasher is further susceptible of pilot lamp operation, there being a pilot lamp PL indicated as connected between the lug 18 and ground so that this pilot lamp will flash in synchronism with the flashing of the turn signal lamps LSL or RSL. Furthermore, a "positive pilot" operation, of the type wherein the pilot lamp remaining either steady on or not being illuminated at all will indicate the burning out of a signal lamp, is provided. This is due to the fact that burning out of any one of the signal lamps will so reduce the load on the flasher that there will be insufficient current to operate the relay 30 and consequently the latter will not close its armature 40. Thus, the pilot lamp PL will not light and this will indicate that there is trouble in the signalling circuit, particularly the burning out of one or more lamps thereof.

It should be appreciated that the pull ribbon 20 need not be included in the electrical circuitry. This pull ribbon can thus be made electrically non-conductive, if desired, although it is usually feasible and practical to make the same electrically conductive. For example, the end of the heater winding 25 illustrated as connected to the pull ribbon 20 could just as well be connected directly to the contact 21 and thus the pull ribbon 20 would, in effect, not constitute part of the electrical circuit, particularly if it were non-conductive. If it is conductive, however, it will necessarily form a parallel circuit with the vane 10. Alternative arrangements will be described more fully hereinafter.

Figure 7:
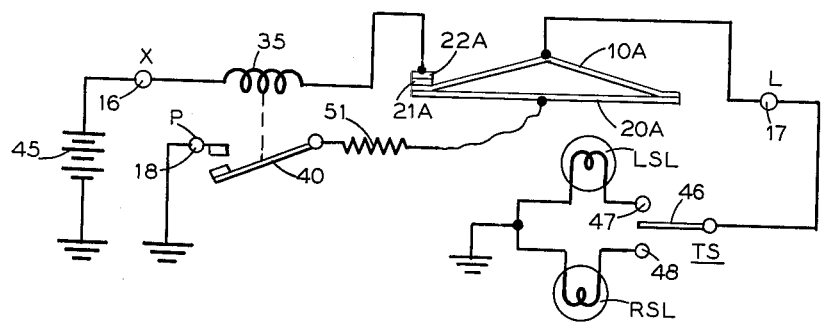
FIGS. 7 through 10 are schematic electrical diagrams, similar to FIG. 1, illustrating modified forms of flashers embodying the invention.

FIG. 7 illustrates an embodiment of the invention in which the heater winding 25 is omitted, and expansion of the pull ribbon 20A is effected by electric current flow therethrough. In this arrangement, the load contact 21A is mounted on the vane 10A, as in the arrangement of FIGS. 1 through 6, and is normally engaged with the load contact 22A. The midpoint or center of the pull ribbon 20A is illustrated as connected directly to the armature 40 operated by the relay coil 35, although a ballast resistor 51 may be connected in series between the pull ribbon 20A and the armature 40. When turn signal switch TS is closed in either direction, the load current will flow through the contacts 22A and 21A into the vane 10A and the pull ribbon 20A, and through the load terminal 17 to the signal lamp circuit. Energization of the relay coil 35 will close the armature 40 so that a heating circuit is completed including the pull ribbon 20A. The arrangement operates in exactly the same manner as described in connection with the arrangement of FIGS. 1 through 6, and any of the positive pilot arrangements shown in FIGS. 1, 14, 15 or 16 may be used. Where the pilot lamp arrangement of FIG. 1 is used in FIG. 7, ballast resistor 51 is not necessary.

Figure 8:
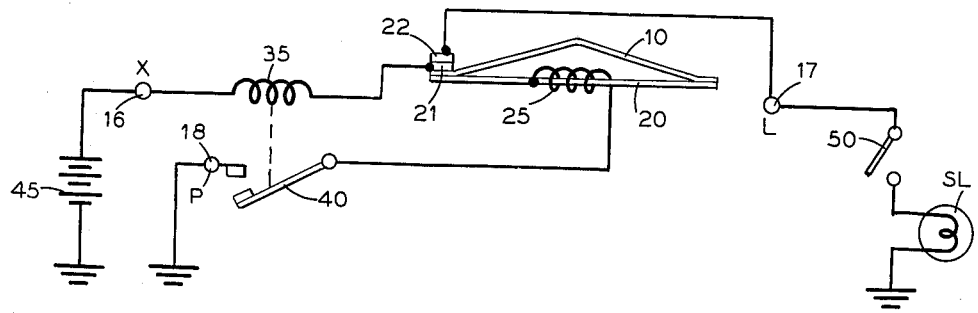
Figure 9:
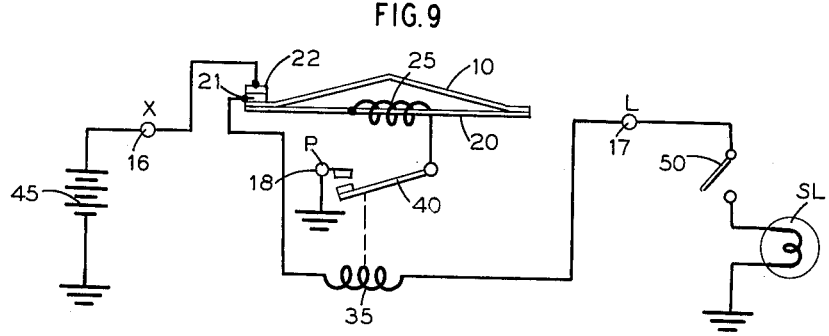

FIGS. 8 and 9 illustrate embodiments of the invention in which the combination of the vane 10 and the pull element 20 is effectively out of the load circuit and merely acts as a mechanical means for opening and closing the load contacts 21 and 22. In the embodiment of FIG. 8, contact 22, which is the fixed load contact, is connected to the battery terminal 16 of the flasher through relay coil 35, and load terminal L or 17 is connected directly to the contact 21. Load terminal 17 of the flasher is indicated as connected through a load switch 50 to selectively energize a signal lamp SL. Pull ribbon 20 is provided with a heating winding 25 which has one end connected to the pull ribbon, although this one end could be directly connected to the movable contact 21. The other end of the heating winding is selectively connected to ground through the relay armature 40 and its associated contact, and which is operated by the relay coil 35. When switch 50 is closed, the load current flows from terminal 16 through relay coil 35, contacts 22 and 21, and load terminal 17. Energization of the relay coil 35 effects closing of the armature 20 to place the heating circuit for the pull element 20 in parallel relation with the load current circuit. The heating current flows from terminal 16 through relay coil 35, contacts 22 and 21, pull element 20, heater winding 25, the armature 40 and to ground. As stated, the combination of vane 10 and pull element 20 merely acts as a mechanical means for opening and closing the load contacts 21 and 22, and it will be further noted that, as in the embodiments previously described, the heating circuit is in parallel with the load circuit from the load contacts on, and thus is insensitive to load current.

The embodiment of FIG. 9 is essentially the same as that of FIG. 8. However, in this case, relay coil 35 is connected between contact 21 and terminal 17, and is thus in the load circuit only, and not in the heating circuit. The arrangement operates in the same manner as that of FIG. 8. From FIGS. 8 and 9, it will be noted that the relay coil 35 may be positioned at any point in the load circuit without any substantial change in the operation of the flasher.

Figure 10:
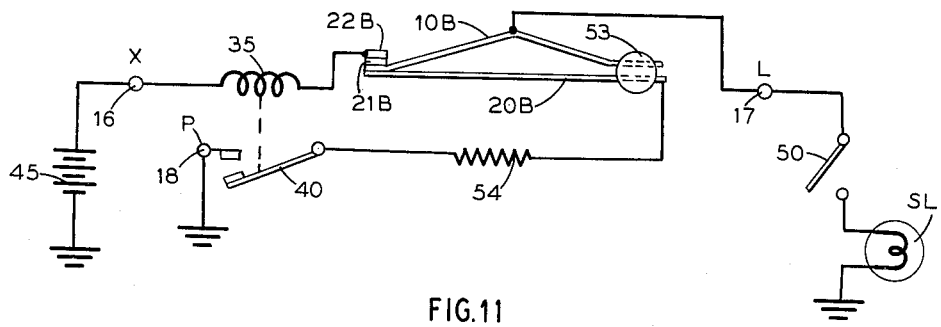
Figure 11:
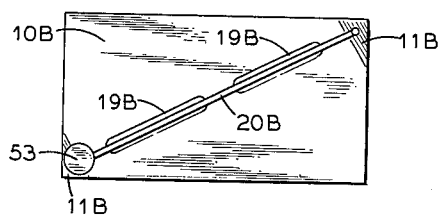
FIG. 11 is a side elevational view of a snap action vane and associated pull element used in the embodiment of the invention shown in FIG. 10.
Figure 12:
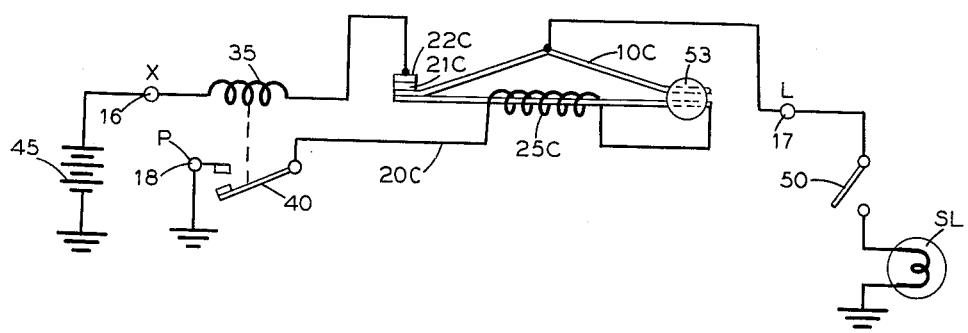
FIG. 12 is a schematic electrical diagram of another modified form of flasher embodying the invention and using the vane and pull element combination shown in FIG. 11.

FIGS. 10, 11 and 12 illustrate flasher arrangements in which the pull element, while operable to snap the vane between its two positions, is not included in the load circuit but is included only in its own heating circuit. FIG. 11 shows the construction of the vane and pull element combination in plan view. In this instance, one end of pull ribbon 20B is secured to a corner 11B of vane 10B, as by soldering, welding, brazing, or other equivalent means, and the other end of pull ribbon 20B is secured to a glass bead or the like 53 which is also secured to the vane 10B. Thus, the latter end of the vane is effectively electrically isolated from the vane 10B.

In the embodiment of the invention shown in FIG. 10, relay coil 35 is again connected in series between battery contact terminal 16 and the load contacts 21B and 22B, and the vane 10B is connected to the load contact 17 which is illustrated as connected, through load switch 50, to a signal lamp SL. Thus, whenever switch 50 is closed, load current flows through relay coil 35 and the vane 10B to the load SL. The heating circuit includes a ballast resistor 54 which is connected to the insulated or electrically isolated end of the pull element 20B and, at its other end, to the relay contacts controlled by the armature 40. Thus, the heating circuit extends from the load contacts 21B, 22B through the pull element 20B, ballast resistor 54, and the relay armature contacts to ground. As the winding 35 is energized by flow of load current to the load circuit, it closes the armature 40 to effectively connect the pull element 20B in the heating circuit so that the latter is heated by flow of current therethrough. The arrangement otherwise operates in the same manner as described for the embodiment shown in FIGS. 1 through 6. If the pilot lamp arrangement of FIG. 1 is used, ballast resistor 54 is not necessary.

FIG. 12 illustrates another arrangement incorporating the vane and pull ribbon combination of FIG. 11, wherein the vane 10C and the pull ribbon 20C are the same as the vane 10B and the pull element 20B of FIGS. 10 and 11. Relay coil 35 is connected in series between the battery terminal 16 and the load contacts, and the vane 10C is connected to the load terminal 17 which is, in turn, connected to a control switch 50 selectively operable to connect the signal lamp SL in the load circuit. The pull element 20C is provided with an insulated heater winding 25C which has one end connected to the electrically isolated end of the pull element 20C and its other end connected through the relay contacts and armature 40 to ground, preferably through the pilot terminal 18 of the flasher. When switch 50 is closed, current will flow from terminal "X" through coil 35, load contacts 21C and 22C, vane 10C, load terminal 17, switch 50, and signal lamp SL. Energization of relay 35 closes a heating circuit which is in parallel with the load circuit. This heating circuit extends from the load contacts 21C and 22C through the vane 10C, the pull element 20C, the heating winding 25C, and the relay contacts to ground. Thus, the heating circuit for the pull element is completely independent of the load circuit, being in parallel therewith, and the heating circuit is thus not sensitive to variations in load current. The arrangement operates in the same manner as described for the embodiment of the invention shown in FIGS. 1 through 6.

Although FIG. 12 illustrates heating winding 25C as a separate winding having one end connected to an end of pull ribbon 20C, the heating winding could be an insulated extension of the pull ribbon would upon the main section of the latter. The heating results and the flasher operation would be the same in both cases.

Figure 13:
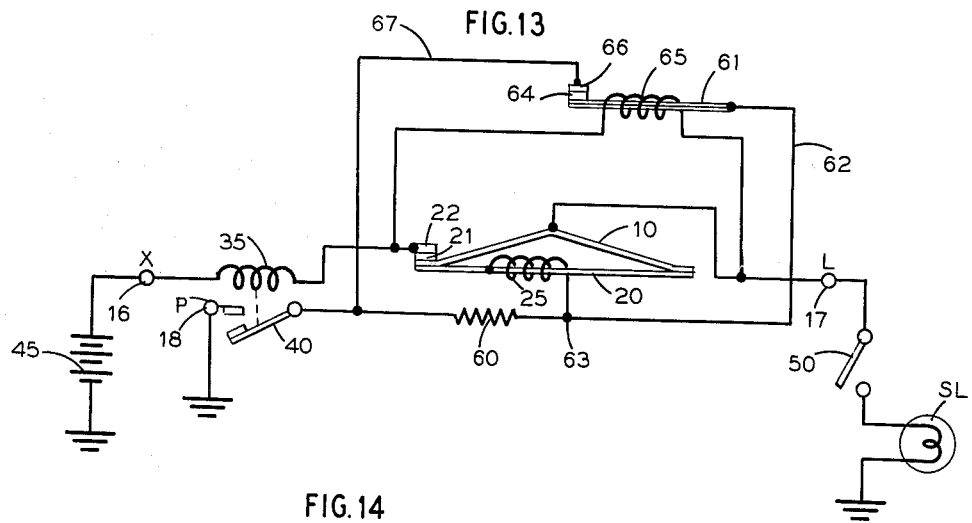
FIG. 13 is a schematic electrical diagram of a flasher embodying the invention and having voltage compensation means associated therewith.

FIG. 13 illustrates the flasher of FIGS. 1 through 6 as provided with voltage variation compensation means. To simplify the wiring diagram, the load has been indicated as a single signal lamp SL connected through a selectively operable load switch 50 to the load terminal 17 of the flasher. The heating winding 25 for the pull element 20 has one end electrically connected to this pull element and the other end is connected to one end of a dropping resistance 60 whose opposite end is connected to the relay armature 40. The dropping resistor 60 is thus in series with the heating winding 25, but is normally shunted in the following manner. A thermomotive element, such as a bimetal element 61, has one fixed end connected by a conductor 62 to the junction 63 between heater winding 25 and resistor 60. The electrically conductive bimetal element 61 has a contact 64 on its free end which is normally engaged with a fixed contact 66 connected by a conductor 67 to the relay armature 40. Thus, the normally closed combination of bimetal element 61, involving the contacts 64 and 66, provides an effective shunt around the resistance 60.

In order to make the bimetal element 61 responsive to the effective voltage drop across the flasher, a heating winding 65 is wound about the bimetal element and has one end connected to the fixed contact 22 of the flasher and the other end connected to the load terminal 17 thereof. Thus, the winding 65 is subjected to substantially the potential drop across the flasher at all times.

The arrangement operates as follows. Assuming that the voltage of the source 45 is at a normal value, such as, for example, about twelve or thirteen volts, the bimetal element 61 has its contact 64 engaged with the contact 66 so that resistor 60 is effectively shunted and the flasher operates in the manner described for the embodiment shown in FIGS. 1 through 6, upon closure of the load switch 50. Each time the load contacts 21 and 22 are separated, the full potential drop across the flasher is impressed across the heating winding 65. The circuit constants are such that, at the mentioned normal voltage value, the heating effected by the winding 65 is insufficient to cause the element 61 to deflect enough to separate the contacts 64 and 66. Should, however, the voltage drop across the flasher rise to a higher value, such as 13.5 or 14 volts, for example, the heating of the element 61 by the winding 65 will be of such a value that the element 61 will deflect to open the contacts 64 and 66. Thereby, the resistor 60 is effectively connected in series in the heating circuit including the winding 25 and reduces the voltage drop and current flow through this heating circuit to restore the flashing rate to its normal value and to restore the on-time ratio of the flasher to its normal value.

Figure 14:
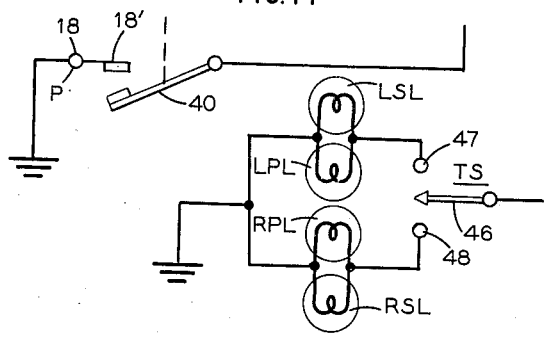
FIGS. 14, 15 and 16 are schematic electrical diagrams of portions of FIG. 1 illustrating alternative pilot lamp arrangements.
Figure 15:
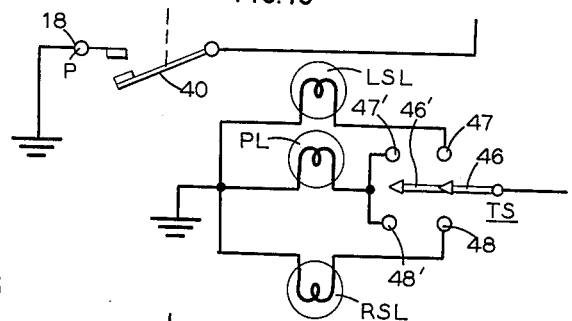
Figure 16:
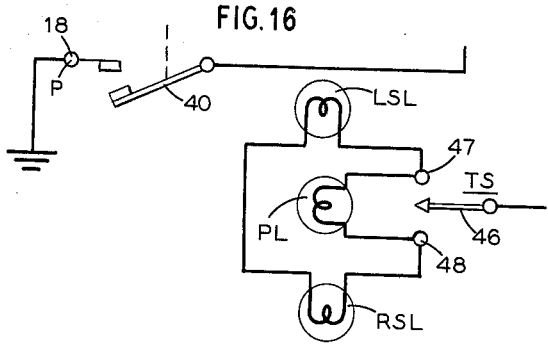

FIGS. 14, 15 and 16 show alternative positive pilot arrangements related to the circuitry of FIG. 1 but useable in others of the illustrated embodiments. In FIG. 14, pilot lamps LPL and RPL are connected in parallel with the respective signal lamps LSL and RSL, and terminal 18 is connected directly to ground. Should a signal lamp burn out, the load current will be insufficient to transfer relay 30, and the associated pilot lamp and remaining signal lamps in the same circuit will remain steady "on."

In FIG. 15, a grounded pilot lamp PL is connected in parallel to additional contacts 47' and 48' of switch TS, and these contacts are selectively engageable by an extension 46' of switch arm 46. Terminal 18 is connected directly to ground. Should either signal lamp burn out, the pilot lamp PL will remain steady "on."

In the arrangement of FIG. 16, pilot lamp PL is connected between switch contacts 47 and 48. In this arrangement, when switch TS is operated to energize lamp LSL, pilot lamp PL is grounded through lamp RSL and will thus be lit, and vice versa. However, should the signal lamp furnishing the grounding connection be defective, lamp PL will remain off. This will be an indication that the then inactive signal lamp is burned out or otherwise defective.

Figure 17:
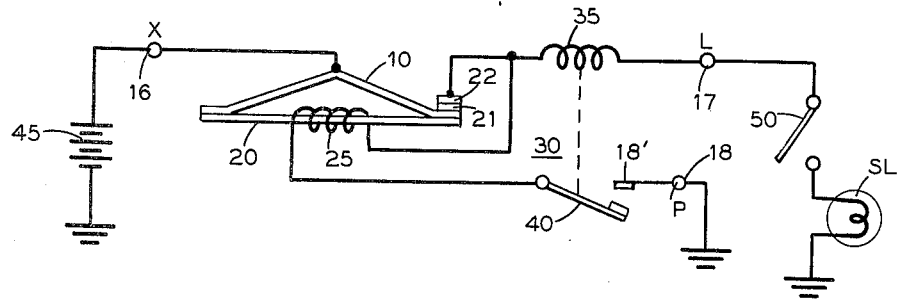
FIGS. 17 through 19 are schematic electrical diagrams illustrating still further modifications of the flasher embodying the invention.

FIG. 17 shows an arrangement in which vane 10 is connected directly to the battery terminal 16 and vane carried contact 21 is connected through fixed contact 22 to one end of relay coil 35 whose other end is connected to load terminal 17. Heating winding 25 for pull element 20 is connected between contact 21 and relay armature 40. This arrangement operates in the same manner as that of FIGS. 1 through 6, and is illustrative of the fact that the particular connections to the vane, relay coil and heating winding may be varied so long as the pull element heating circuit is in parallel with the load circuit.

Figure 18:
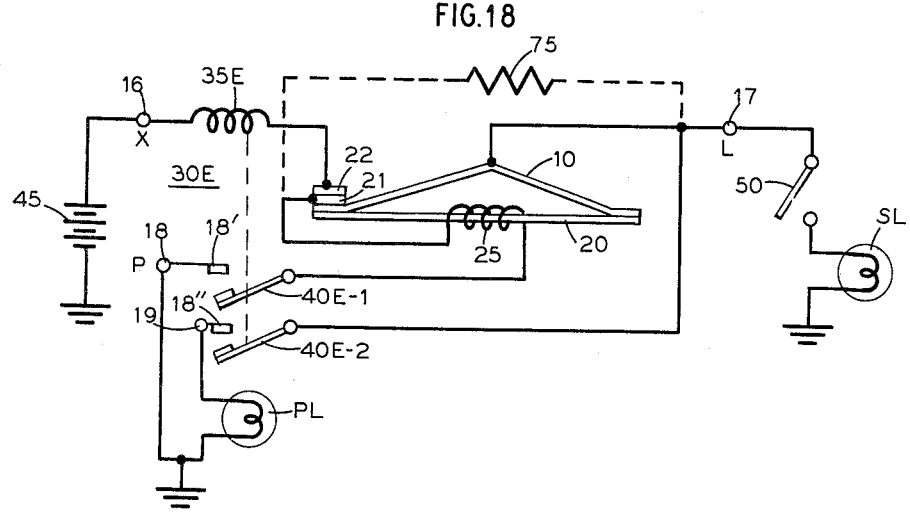

FIG. 18 shows a load insensitive series flasher having a positive pilot arrangement controlled by an additional contact of the relay. In this arrangement, relay coil 35E is connected between battery terminal 16 and fixed contact 22. Heating winding 25 is connected at one end to vane carried contact 21 and at its other end to relay armature 40E-1 which, when coil 35E is energized, engages contact 18' connected to grounded terminal 18 to complete the heating circuit for pull element 20. Relay 30E has a second armature 40E-2 which is connected to load terminal 17 and is normally disengaged from a contact 18" connected to a fourth lug or terminal 29. A pilot lamp PL is connected between terminal 19 and ground.

When load switch 50 is closed, relay 30E transfers its armatures 40E-1 and 40E-2. This closes the heating circuit and the pilot lamp circuit in synchronism. Should one or more signal lamps be defective, the load current through relay coil 35E will be insufficient to transfer the relay armatures. Pilot lamp PL will remain off to provide a positive pilot indication of a defective signal lamp.

As indicated in broken lines, a low resistance shunt 75 may be connected between contact 21 and load terminal 17 so that vane 10 and pull element 20 are shorted out of the circuitry and thus act merely as a mechanical switching means for the load contacts. This shunt arrangement can be used in any of the embodiments where it is desired to have the vane and pull ribbon cut completely out of the circuitry.

Figure 19:
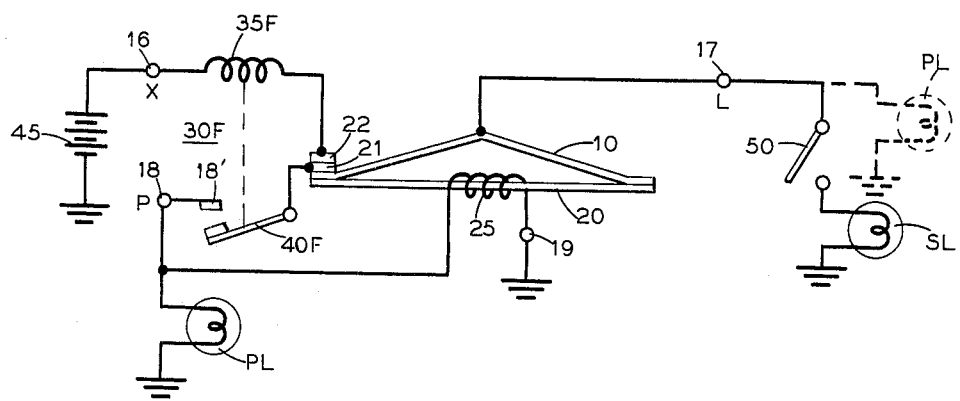

FIG. 19 illustrates another embodiment in which a positive pilot action is provided through the relay. In this embodiment, coil 35F is again connected between battery terminal 16 and fixed contact 22, with the vane and pull ribbon combination being connected between vane contact 21 and load terminal 17. However, relay armature 40F is connected directly to vane contact 21 and is normally disengaged from contact 18' which is connected to terminal 18. Heating winding 25 is connected between terminal 18 and fourth terminal 19. A pilot lamp PL is connected between terminal 19 and ground.

When load switch 50 is closed, relay coil 35F is energized to transfer armature 40F to engage contact 18'. This closes the heating and pilot lamp circuits which are in parallel with each other between terminal 18 and ground. Should a signal lamp be defective, the relay coil current will be insufficient to transfer armature 40F and pilot lamp PL will remain off to provide a positive pilot indication. Optionally, a pilot lamp PL can be connected in parallel with signal lamp SL, and will provide steady on positive indication when the relay current is insufficient to transfer armature 40F.

In each of FIGS. 1, 7 through 10, 12, 13, 17, 18 and 19, which are essentially schematic wiring diagrams of the flasher of the invention, it will be noted that the movable contact 21 has been illustrated as on the side of vane 10 opposite to that side of the vane having pull element 20 secured thereto. The contact 21 is illustrated in this position solely for clarity of illustration of the electrical circuit. In actual practice, and as will be clear from reference to FIGS, 2 through 6, the vane-carried movable contact 21 is on the same side of the vane as that to which the pull element 20 is secured, and it should be understood that, in any practical construction embodying the schematic arrangements of FIGS. 1, 7 through 10, 12, 13, 17, 18 and 19, the vane-carried movable contact would actually be on the same side of the vane as that carrying the pull ribbon 20.

While specific embodiments of the invention have been shown and described in detail to illustrate the application of the principles of the invention, it will be understood that the invention may be embodied otherwise without departing from such principles.

What is claimed is:

1. A load insensitive thermomotive flasher comprising, in combination, a snap action member having a portion fixedly mounted at a support point; a heat expansible pull element secured to said member and, in the cold and contracted condition, normally constraining said member to assume a stress-deformed position; said member, upon a predetermined expansion of said pull element upon heating of the latter, snapping to a restored position; an input terminal, for connection to a source of electric potential, and a load terminal; a load circuit interconnecting said input and load terminals and including a pair of first contacts; an electric heating circuit for said pull element connected to said input terminal in parallel with said load circuit and including a pair of second contacts; a relay including a coil element and an armature element transferred upon energization of said coil element, one of said relay elements being connected in series in said load circuit and the other of said relay elements being connected in series in said heating circuit; said relay coil element being connected in series with a normally closed pair of said contacts; said relay armature element controlling a normally open pair of said contacts and closing the latter upon energization of said coil element; one of said normally closed pair of contacts being movable by said member so that said normally closed contacts are snapped open upon snapping of said member to said restored position; whereby, upon connection of one terminal of a source of potential to said input terminal and connection of the other terminal of a source of potential through a load to said load terminal, and also to the other terminal of said heating circuit, said relay coil element will be energized to transfer said relay armature element to close said normally open contacts, and current will flow through said load circuit and said electric heating circuit, in parallel, for cyclic operation of said flasher by alternate heating and cooling of said pull element.

2. A load insensitive thermomotive flasher, as claimed in claim 1, wherein said electric heating circuit includes a heating winding wound in insulated relation on said pull element and connected in series in said heating circuit.

3. A load insensitive thermomotive flasher, as claimed in claim 1, wherein said pull element is electrically conductive and is connected in said heating circuit for heating thereof by current flow therethrough.

4. A load insensitive thermomotive flasher, comprising, in combination, a snap action member having a portion fixedly mounted at a support point; a heat expansible pull element secured to said member and, in the cold and contracted condition, normally constraining said member to assume a stress-deformed position; said member, upon a predetermined expansion of said pull element upon heating of the latter, snapping to a restored position; an input terminal, for connection to a source of electric potential, and a load terminal; a series load circuit interconnecting said input and load terminals and including a pair of normally closed load contacts; an electric heating circuit for said pull element connected to said input terminal in parallel with said load circuit and including a pair of normally open contacts; a relay including a coil element and an armature element transferred upon energization of said coil element, said coil element being connected in said load circuit in series with said normally closed load contacts, and said relay armature element controlling said normally open contacts and closing said normally open contacts upon energization of said coil element; one of said normally closed contacts being movable by said member so that said normally closed contacts are snapped open upon snapping of said member to said restored position; whereby, upon connection of one terminal of a source of potential to said input terminal and connection of the other terminal of said source of potential through a load to said load terminal, and also to the opposite terminal of said heating circuit, said relay coil will be energized to close said armature and current will flow through said load circuit and said heating circuit, in parallel, for cyclic operation of said flasher by alternate heating and cooling of said pull element.

5. A load insensitive thermomotive flasher, as claimed in claim 4, including a heating winding wound, in insulated relation, on said pull element and connected in series in said heating circuit.

6. A load insensitive thermomotive flasher, as claimed in claim 4, in which said pull element is electrically conductive and is connected in said heating circuit.

7. A load insensitive thermomotive flasher, as claimed in claim 4, in which said snap action member comprises electrically conductive metal and is electrically connected to said load terminal; said one normally closed contact being electrically and mechanically secured to said snap action member for movement therewith, and the other normally closed contact being fixed relative to said support point.

8. A load insensitive thermomotive flasher, comprising, in combination, a snap action vane initially formed into a restored position; a heat expansible pull element secured to said vane and, in the cold and contracted condition, constraining said vane into a stress-deformed position; said vane, upon a predetermind expansion of said pull element upon heating of the latter, snapping to the restored position; means fixedly supporting said vane at a support point thereon, whereby another portion of said vane will have a substantial amplitude of motion relative to said support point during snapping of said vane between its two said positions; an input terminal, for connection to a source of electric potential, and a load terminal; a first load contact fixed relative to said support point; a second load contact movable with said vane and normally engaged with said first load contact; a series load circuit interconnecting said input and load terminals and including said load contacts; an electric heating circuit for said pull element connected to said input terminal in parallel with said load circuit and including a pair of normally open contacts; a relay including a coil element and an armature element transferred upon energization of said coil element, said relay coil element being connected in said load circuit in series with said load contacts, and said relay armature element controlling said normally open contacts, and closing said normally open contacts upon energization of said coil element; whereby, upon connection of one terminal of a source of potential to said input terminal and connection of the other terminal of said source of potential through a load to said load terminal, and also to the other terminal of said heating circuit, said relay coil element will be energized to transfer said armature element to close said normally open contacts, and current will flow through said load circuit and said heating circuit, in parallel, for cyclic operation of said flasher by alternate expansion and contraction of said pull element.

9. A load insensitive thermomotive flasher, as claimed in claim 8, wherein said heating circuit includes a heating winding wound, in insulated relation, on said pull element and connected in series in said heating circuit.

10. A load insensitive thermomotive flasher, as claimed in claim 8, in which said pull element is electrically conductive and is connected in said heating circuit for heating of said pull element by current flow therethrough.

11. A load insensitive thermomotive flasher, as claimed in claim 8, in which said vane is electrically conductive metal and is connected to said load terminal; said second load contact being electrically and mechanically connected to said vane.

12. A load insensitive thermomotive flasher, as claimed in claim 8, in which one end of said relay coil element is connected directly to said second load contact and the other end of said relay coil element is connected directly to said load terminal; whereby said load circuit by-passes said snap action vane.

13. A load insensitive thermomotive flasher, as claimed in claim 11, in which said pull element has one end thereof electrically and mechanically connected to said vane, the other end of said pull element being mechanically connected to said vane but electrically insulated therefrom.

14. A load insensitive thermomotive flasher, as claimed in claim 13, in which said pull element is connected in series in said heating circuit.

15. A load insensitive series type thermomotive flasher, as claimed in claim 13, including a heating winding wound, in insulated relation, on said pull element and connected in series in said heating circuit.

16. A load insensitive thermomotive flasher, as claimed in claim 15, in which said pull element is connected in series with said heating winding in said heating circuit.

17. A load insensitive thermomotive flasher, as claimed in claim 4, including a dropping resistor connected in series in said heating circuit; a shunt circuit for said dropping resistor including a third pair of contacts which are normally closed to shunt said dropping resistor; and flasher voltage responsive operating means for said third pair of contacts, connected across said flasher so as to be responsive to the voltage drop across the latter, said operating means opening said third pair of contacts when the voltage drop across said flasher exceeds a predetermined value to remove the shunt from said dropping resistor to connect the latter effectively in said heating circuit.

18. A load insensitive thermomotive flasher, comprising, in combination, a snap action member; a heat expansible pull element secured to said member and, in the cold and contracted condition, normally constraining said member to assume a stress-deformed position, said member, upon a predetermined expansion of said pull element upon heating of the latter, snapping to a restored position; an input terminal, for connection to a source of electric potential, and a load terminal; a series load circuit, including a pair of normally closed contacts, interconnecting said input and load terminals for flow of load current therebetween; an electric heating circuit for said pull element connected in parallel with said load circuit and including a pair of normally open contacts; and means operable, responsive to the flow of load current through said load circuit, to close said normally open contacts.

No references cited.

LLOYD McCOLLUM, *Primary Examiner.*